United States Patent [19]
Schlüter-Wohlfeil

[11] Patent Number: 5,501,543
[45] Date of Patent: Mar. 26, 1996

[54] QUICK LOCKING DEVICE FOR AXIAL LOCKING

[75] Inventor: Jürgen-Ulrich Schlüter-Wohlfeil, Böklund, Germany

[73] Assignee: Joachim Uhing KG GmbH & Co., Mielkendorf, Germany

[21] Appl. No.: 254,949

[22] Filed: Jun. 7, 1994

[30] Foreign Application Priority Data

Jun. 21, 1993 [DE] Germany .................. 43 20 480.5

[51] Int. Cl.⁶ ............................................. F16B 21/00
[52] U.S. Cl. ................... 403/321; 242/597.4; 242/597.5; 403/315; 403/325
[58] Field of Search ............... 242/597.4, 597.5, 242/597.6, 599.2; 403/315, 316, 321, 322, 325

[56] References Cited

U.S. PATENT DOCUMENTS

| Re. 31,015 | 8/1982 | Moore .............................. 242/597.4 X |
| 3,501,107 | 3/1970 | Assony .............................. 242/599.2 |
| 3,737,136 | 6/1973 | Snurr .............................. 403/109 X |

FOREIGN PATENT DOCUMENTS

| 540886 | 1/1932 | Germany . |
| 1758482 | 12/1957 | Germany . |
| 1951127 | 12/1966 | Germany . |
| 1957121 | 12/1966 | Germany . |
| 7518465 | 12/1975 | Germany . |
| 2547366 | 4/1977 | Germany .............................. 403/322 |
| 9101360 | 2/1991 | Germany . |
| 916419 | 1/1963 | United Kingdom .............. 242/599.2 |

OTHER PUBLICATIONS

Quik-Lok "Change Spools—Without Tools".
Dubbel 14, Bild 35, p. 368, 1981.

*Primary Examiner*—Brian K. Green
*Assistant Examiner*—Andrea Chop
*Attorney, Agent, or Firm*—Michael J. Striker

[57] ABSTRACT

A quick locking device for producing axial locking forces on a smooth shaft has a housing, a freely supported clamping ring adapted to surround a shaft and located inside the housing with pretensioning by a spring force in a ring-shaped chamber changeable in an axial direction, diametrically opposite pins provided on the clamping ring and contacting surfaces which limit the chamber in contact points, a locking unit and a clamping unit provided with a locking thread and arranged so that axial locking forces are transmitted through the locking unit and the locking thread of the clamping unit and through the pins for form-locking connection between the clamping ring and the shaft in the region of self-locking, and a spring providing tensioning of the clamping ring and vectorially supporting a clamping action through the pins.

9 Claims, 6 Drawing Sheets

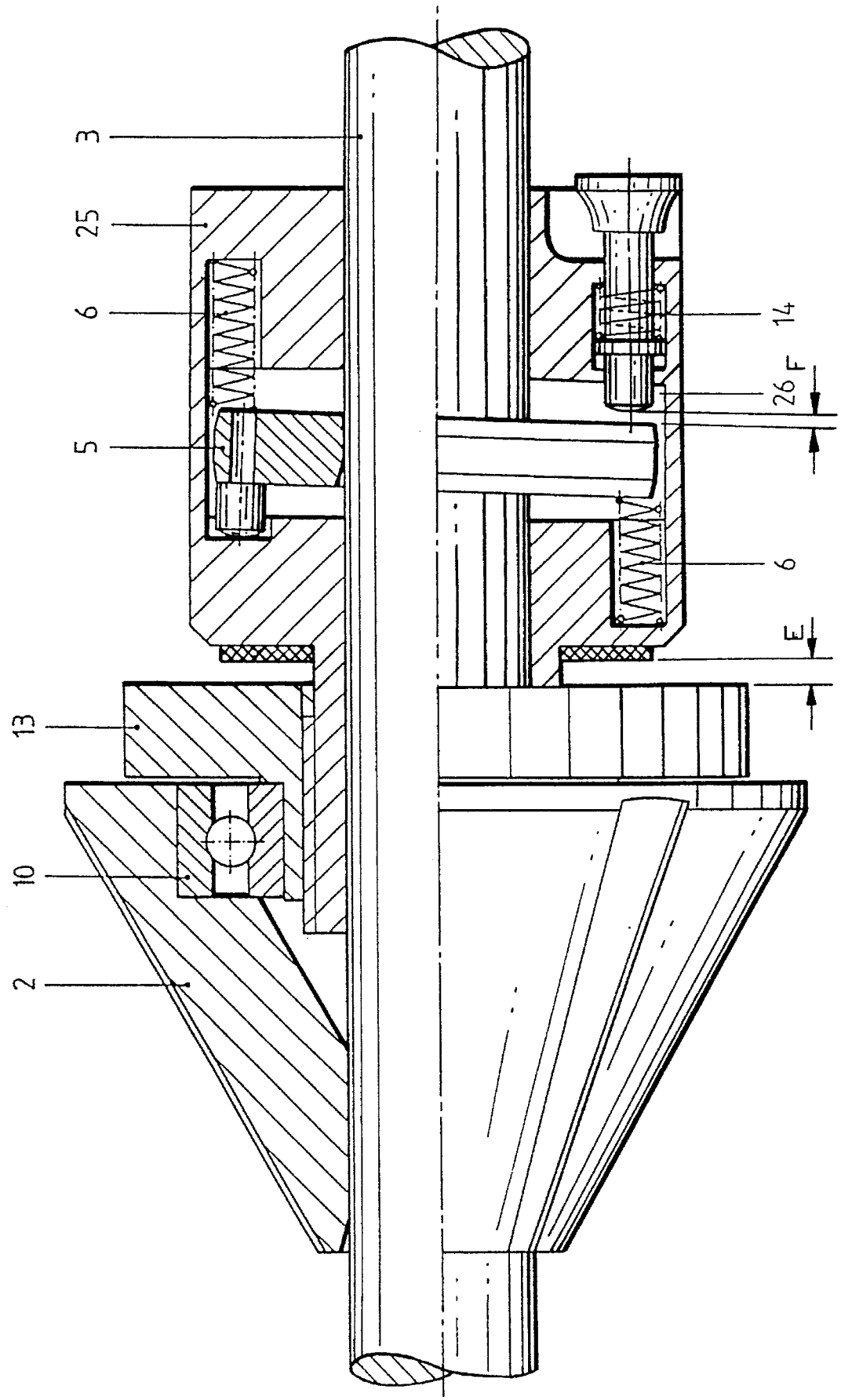

QUICK LOCKING DEVICE FOR AXIAL LOCKING

BACKGROUND OF THE INVENTION

The present invention relates to a quick locking device for axial locking.

More particularly, it relates to a force-transmitting quick locking device for producing locking forces on a smooth shaft, in particular for supply rollers and spools.

Force-transmitting quick locking devices for supply rollers and spools are generally known in the art. Some of such devices are disclosed for example in the German documents GM 7518465 and G 91 01 360.7. For actuation of each of these devices auxiliary tools are needed. Also, for example the device disclosed in the German document G 91 01 360.7 is suitable only for a predetermined shaft rotary direction.

German document DE GM 1957 121 discloses a locking ring which presses the eccentrically arranged locking piece in the tilted position and has shorter legs which are connected with the shaft in force-transmitting manner. The force transmission is listed by simultaneous compression of the gripping disc and the ring surface. The disadvantage of this construction is that the action forces are transmitted through a highly loaded rotary axis in a power housing which is heavy, so that maintenance expenses are required and the handling is difficult.

German document DE DM 1951 127 discloses another device in which a locking ring surrounds the shaft and is arranged turnably to its axis. The locking ring is pressed by axial spring forces to the tilted position. A grip is provided for loosening the locking. As mentioned with respect to the device disclosed in the German document DE-GM 1957 121 this device in which the axial locking forces increase opposite to the blocking direction proportionally to normal and loosening forces can be unlocked only with application of great force. These devices are only parts of the locking devices since an increase or decrease of the axially acting forces is not possible. To the contrary, with reducing axial opposite forces the direct force action on the unlocking elements result in position changes of the locking device and as a result operational disturbances.

German documents DE-GM 1758 482 and DE-PS 540 886 disclose locking cones which are turned by means of the thread of the stationary device part centrally in the coil body to be clamped. The disadvantage is that during the locking process the friction between the coil body and the cone must be overcome, and due to their frictional coupling both devices are suitable only for one rotary direction.

A further arrangement under the name QUIK-LOC is known, which can be used only for axial fixation without the possibility of post-locking. For manual comparable locking applications also form-locking systems are utilized, for example threaded spindles and nut elements.

Finally, a clamping connection Bild 35 Dubbel 14. Auflage, page 368 is known, in which the locking action above the region of the self-locking threshold depends on the action and safety of the system. Such friction locking devices are provided for example for axial applications. The present invention is a functional expansion of such arrangements.

SUMMARY OF THE INVENTION

Accordingly, it is an object of the present invention to provide a quick locking device of the above mentioned general type, which avoids the disadvantages of the prior art.

More particularly, it is an object of the present invention to provide a locking arrangement which forms a form-transmitting, maintenance-free quick locking system which can be placed arbitrarily on the shaft, whose axial locking forces are adjustable, which is suitable for both rotary directions, and which can be actuated without auxiliary tool by hand.

In keeping with these objects and with others which will become apparent hereinafter, one feature of the present invention resides, briefly stated, in a quick locking device for producing axial locking forces, which is clamped between a stationary abutment and an abutment axially displaceable on the shaft, and a concentric force-transmitting quick locking device is displaceable over the free shaft end against a supply roller and arrestable in an opposite direction, wherein in accordance with the present invention, a freely supported locking ring which surrounds a shaft is pretensioned with a spring and located inside a housing in a ring-shaped chamber changeably in an axial direction, the locking ring has diametrically opposite pins which are in contact with surfaces limiting the chamber, and the axial locking forces are supplied through the locking unit and the locking thread in the holding unit and lead through the pins to the form-locking connection between the locking ring and the shaft in the region of the self-locking, wherein the spring vectorially supports the locking action through pins.

When the device is designed in accordance with the present invention, a releasing of the locking device and the operational condition is not possible since due to axial eccentric force action on the locking disc in the region of the self-locking, in accordance with the known static condition of the self-locking the friction forces grow proportionally to the normal forces.

Also, the holding forces (force-transmitting forces) are completely taken interiorally by the clamping ring and not transmitted to the housing. Therefore, the housing can be thin-walled and light weight, and therefore the required body forces can be reduced. The freely supported locking ring does not apply load to bearing points and does not require maintenance expenses.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 3a is a view showing the section of the quick locking device of FIG. 3 in a working or clamping position;

DESCRIPTION OF THE PREFERRED EMBODIMENTS

Figure 1:
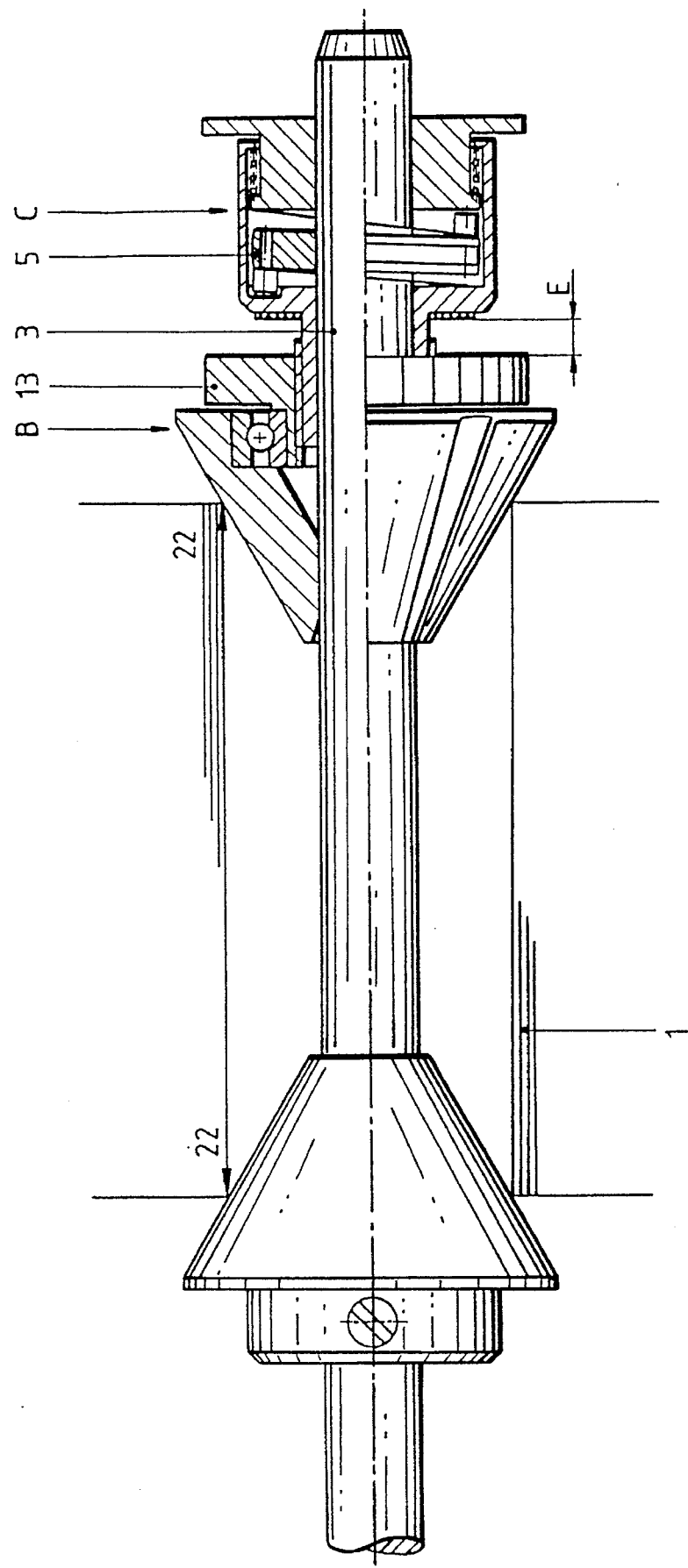
FIG. 1 is a view showing a supply roller with a quick locking device in a working position in which it is held and clamped.

FIG. 1 shows a quick locking device in accordance with the present invention in a working position or holding position. A locking wheel 13 is turned and centers a cone 2 of a supply roller 1 through a bearing 10, while by the thread pitch between the locking unit B and the holding unit C a locking distance E is obtained. For exchanging the supply roller the force 22 which axially annularly acts on the cone must be reduced by turning the locking wheel 13 in loosening thread direction of the force acting through the thread 11 on the holding unit, and the locking distance E is reduced as shown in FIG. 2.

Figure 2:
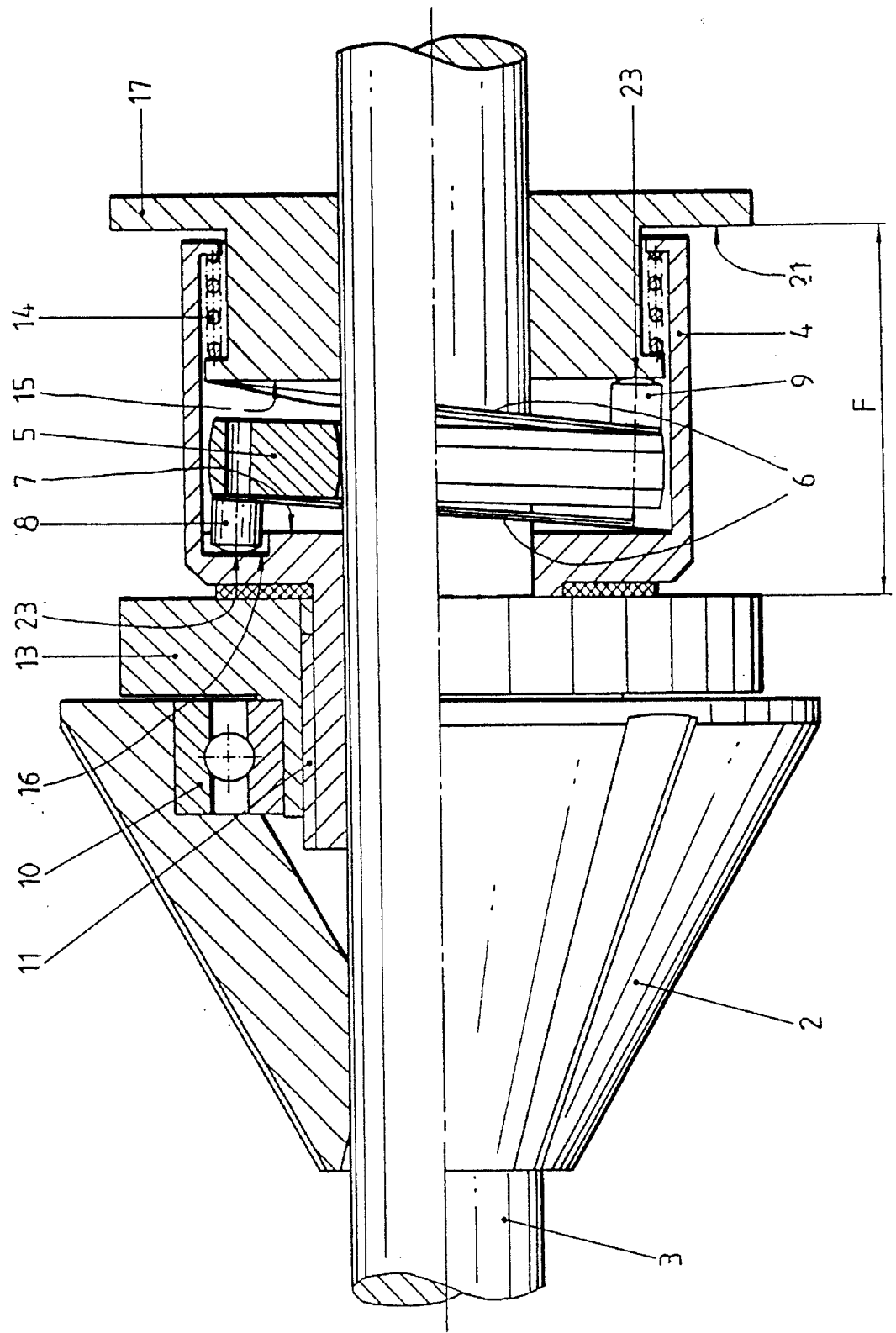
FIG. 2 is a view showing a section of a quick locking device in accordance with the present invention.
Figure 5:
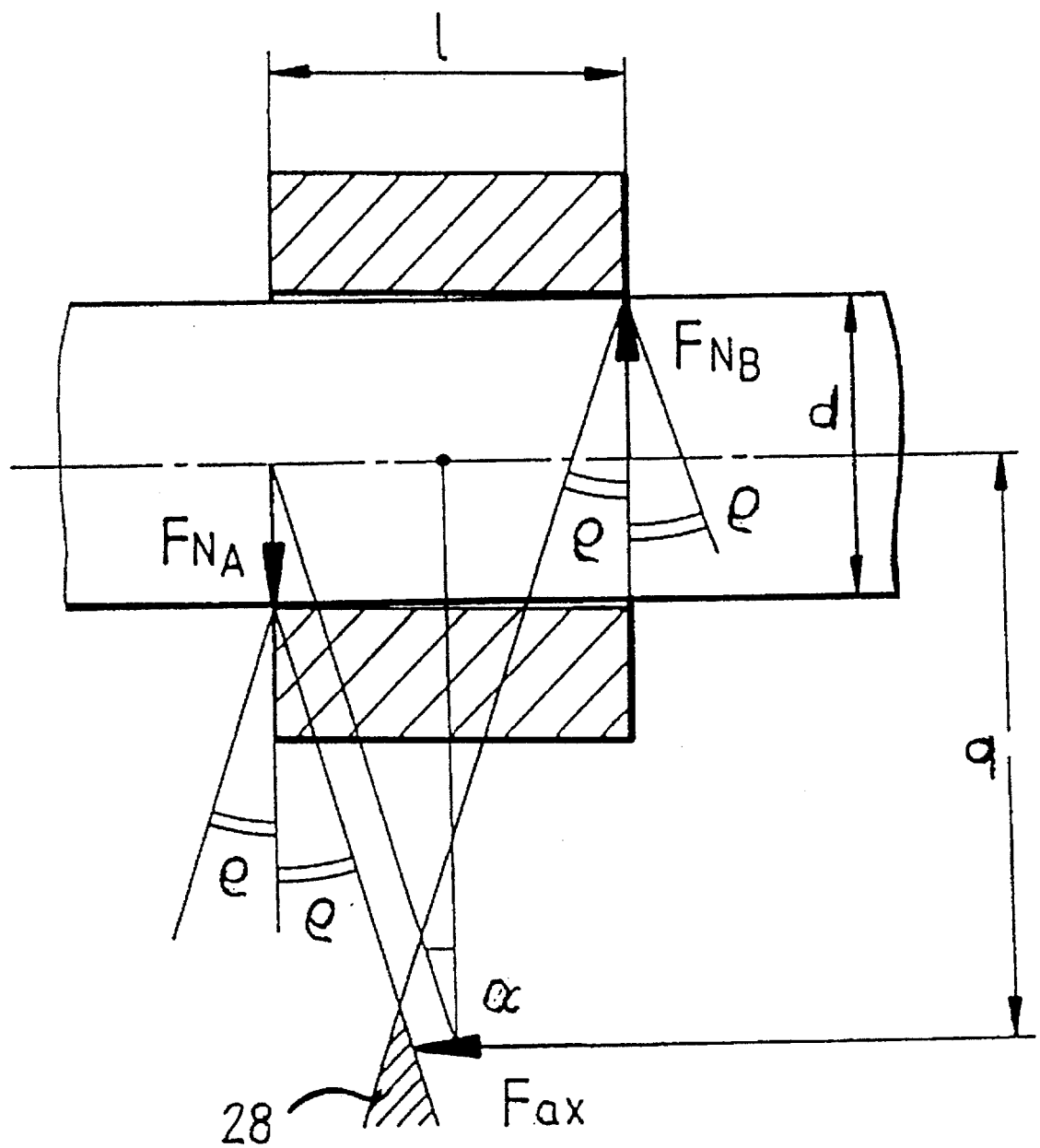
FIG. 5 is a view illustrating a locking process with the inventive quick locking device.

As can be seen from FIG. 2, a position of the clamping ring 5 is adjustable by springs 6 and 14 relative to a blocking ring 17 guided in a housing 4 on the shaft 3. By increasing the distance F the stronger spring 14 is compressed while the weaker springs 6 can be relaxed relative to the parallel ring surfaces 7 and 15. In the increasing chamber between the surfaces 7 and 15, the position of the clamping ring 5 changes so that due to the spring action of the springs 6 the pins 8 and 9 located eccentrically diagonally opposite on the clamping ring 5 further maintain contact to the contact points 23. Thereby the clamping ring 5 which is shown in FIG. 5 with contact points $F_{NA}$ and $F_{NB}$ is disengaged and the shaft is freely movable. The vectorial overhang of the spring force of the spring 14 acts on the clamping ring 5 so that due to the holding action $F_{NA}$ and $F_{NB}$ in the peripheral direction and to the shaft diameter d a predetermined counter-moment is available for thread friction during actuation of the locking wheel 13. The housing 4 has a recess 16 in which the pin 8 engages. The locking ring 17 has a surface 21 arranged so that when the spring 14 is compressed and the contact between the pin 9 and the surface 15 is interrupted, the shaft 3 is not released. Therefore, an unintentional releasing is prevented to provide an operational safety.

Figure 3:
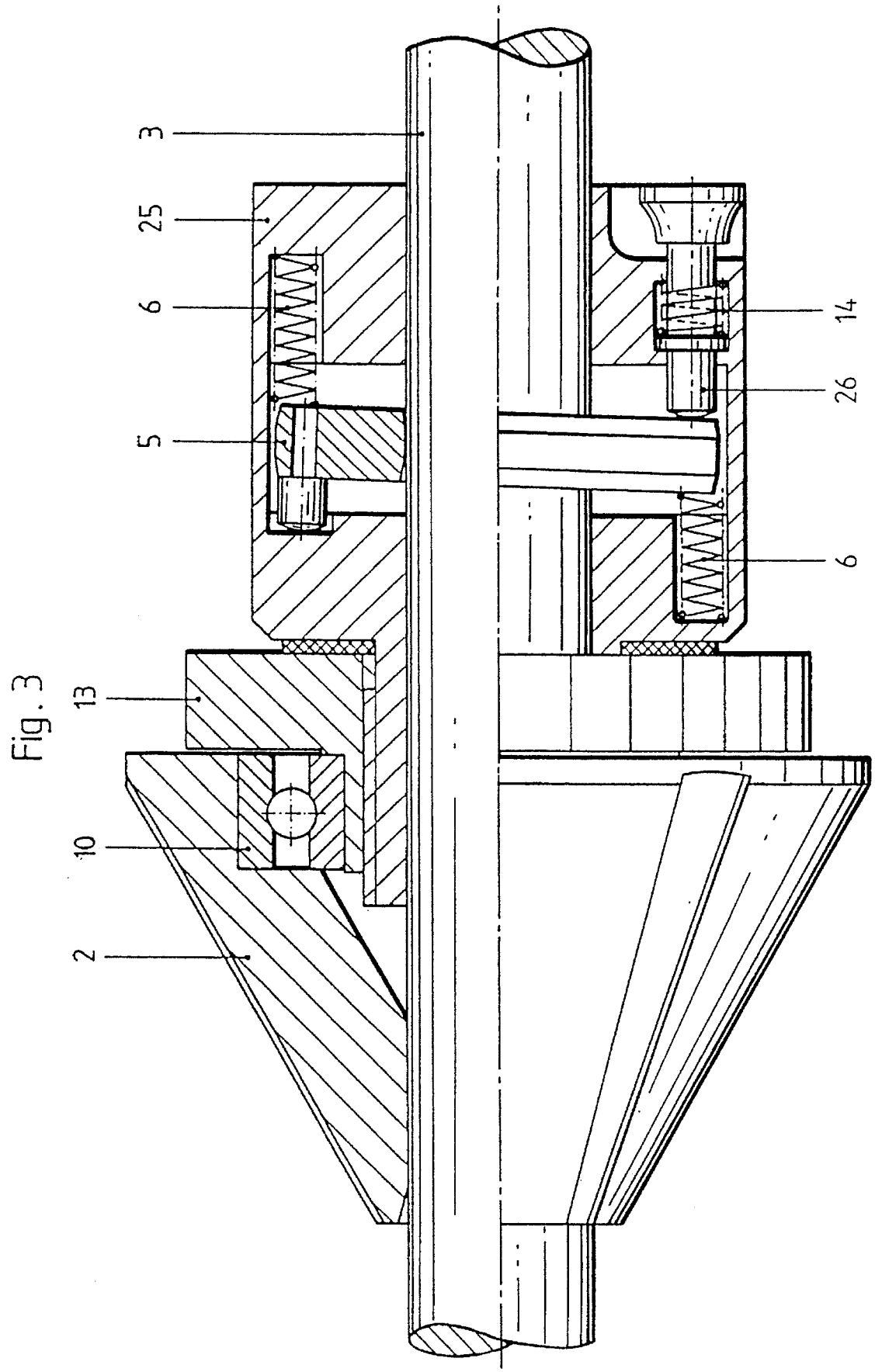
FIG. 3 is a view showing a section of a quick locking device in accordance with a further embodiment of the present invention.

FIG. 3 shows another embodiment of the quick locking device in accordance with the present invention. It has the same principle construction. At the same time it has a closed housing 25 with a springy pressing member 14, 26. The pressing member 14, 26 presses against the clamping ring 5 in an opposite direction to the spring 6 with a domineering force. This embodiment is especially suitable for great shaft diameters. The cooperation of the structural elements is the same as in the previous embodiment.

FIG. 3a shows the quick locking device of FIG. 3 in a working or clamping position, wherein the locking distance is identified as E and the axial locking force is identified as 22. A further axially acting force $F_{ZUG}$ interrupts the contact to the clamping ring 5 with a distance F. This additional force however acts through the housing 25, which reinforces the clamping force of the corresponding contact point 23 and the pin 8 vectorially with the axial locking force 22. Thereby a releasing/unlocking of the locking device is not possible.

Figure 4:
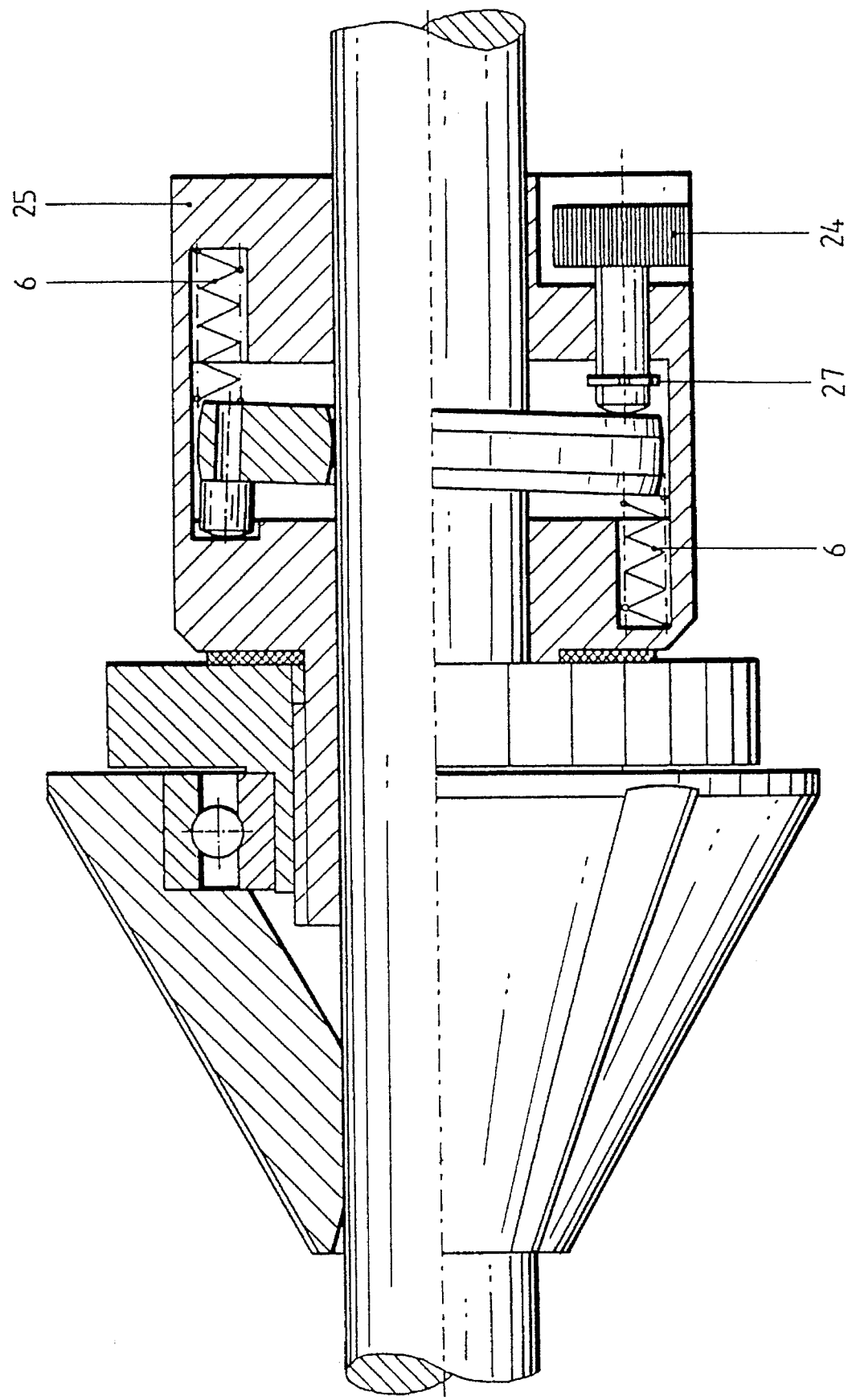
FIG. 4 is a view showing a section of the quick locking device in accordance with still a further embodiment of the invention.

FIG. 4 shows still a further embodiment of the invention, which does not have a spring 14 or a springy pressing member 26. The pretensioning required for handling the clamping unit B which acts by the spring 14 over the contact point 23 and the pin 9 on the clamping ring 5, is produced manually by an adjusting screw 24. The adjusting screw 24 is provided with a securing element 27 for preventing falling out and loosening the adjusting screw.

FIG. 5 shows the physical situation for the force-transmitting connection and the hatched region of the self-locking 28. The conditions for self-locking required for the safety of the locking connection include the importance of the correct dimensioning in order to guarantee a reliable locking.

It will be understood that each of the elements described above, or two or more together, may also find a useful application in other types of constructions differing from the types described above.

While the invention has been illustrated and described as embodied in a quick locking device for axial locking, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. A quick locking device for producing axial locking forces on a smooth shaft, comprising a locking unit; a holding unit movable relative to said locking unit and having a housing with a ring-shaped chamber limited by chamber surfaces; a freely supported clamping ring adapted to surround a shaft and located inside the housing with pretensioning by a spring force in said ring-shaped chamber changeable in an axial direction; diametrically opposite pins provided on said clamping ring and contacting said chamber surfaces in contact points, said locking unit and said holding unit being provided with a locking thread and arranged so that axial locking forces are transmitted through said locking unit and said locking thread to said holding unit and through one of said pins for locking connection between said clamping ring and the shaft to provide self-locking; and a spring providing tensioning of said clamping ring and vectorially supporting a clamping action through another of said pins.

2. A quick locking device as defined in claim 1, wherein said pins are mounted on said clamping ring, said locking unit having a cone, said housing having a recess in which said one pin engages in one of said contact points toward said cone so as to take moments during locking and releasing steps.

3. A quick locking device as defined in claim 1; and further comprising means for forming a surface arranged so that when said spring is compressed and said contact between said another pin and a respective one of said chamber surfaces is interrupted a shaft is not released and therefore an unintentional releasing is prevented so as to provide an operational safety.

4. A quick locking device as defined in claim 1, wherein said locking unit has a cone, a bearing associated with said cone, and a locking wheel arranged so that during locking, said locking wheel is displaced and a distance between the locking unit and the holding unit is reduced, said bearing does not allow any friction between an element to be locked and said cone.

5. A quick locking device as defined in claim 4, wherein said cone is turnably connected with said locking wheel by said bearing and is axially adjustable by said locking thread relative to said holding unit so as to produce an individual locking force by said locking unit.

6. A quick locking device as defined in claim 4; wherein said spring force applies small spring forces in directions opposite to said contact points, while said spring applies a greater spring force to said clamping ring in a direction towards said contact points, so that an axial force acts on said locking wheel in a predetermined direction while said spring works as a recoil block.

7. A quick locking device as defined in claim 4; wherein said spring force is formed so that a spring force of said spring is stronger the force of said spring force, whereby a predetermined normal force acts through said clamping ring on a shaft and provides a resistance for turning of said locking wheel.

8. A quick locking device for producing axial locking forces on a smooth shaft, comprising a locking unit; a holding unit movable relative to said locking unit and having a housing with a ring-shaped chamber limited by chamber surfaces; a freely supported clamping ring adapted to surround a shaft and located inside the housing with pretensioning in said ring-shaped chamber changeable in an axial direction; at least one pin provided on said clamping ring and contacting one of said chamber surfaces in a contact point, said locking unit and said holding unit being provided with a locking thread and arranged so that axial locking forces are transmitted through said locking unit and said locking thread to said holding unit and through said at least one pin for locking connection between said clamping ring and a shaft to provide self-locking; and a springy pressing member providing tensioning of said clamping ring and vectorially supporting a clamping action.

9. A quick locking device for producing axial locking forces on a smooth shaft, comprising a locking unit; a holding unit movable relative to said locking unit and having a housing with a ring-shaped chamber limited by chamber surfaces; a freely supported clamping ring adapted to surround a shaft and located inside the housing with pretensioning in said ring-shaped chamber changeable in an axial direction at least one pin provided on said clamping ring and contacting one of said chamber surfaces in a contact point, said locking unit and said holding unit being provided with a locking thread and arranged so that axial looking forces are transmitted through said locking unit and said locking thread to said holding unit and through said at least one pin for locking connection between said clamping ring and a shaft to provide self-locking; and a screw providing tensioning of said clamping ring and vectorially supporting a clamping action.

* * * * *